United States Patent [19]

York

[11] Patent Number: 4,678,422

[45] Date of Patent: Jul. 7, 1987

[54] SYSTEMS AND METHODS FOR PRECISE, ACCURATE FORMATION OF PRODUCTS BY PHOTOABLATION

[76] Inventor: Kenneth K. York, Apt. No. 28, 1633 Amberwood Dr., Pasadena, Calif. 91030

[21] Appl. No.: 797,228

[22] Filed: Nov. 12, 1985

[51] Int. Cl.$^4$ .............................................. B25B 17/00
[52] U.S. Cl. ................................................. 425/174.4
[58] Field of Search ............... 425/142, 289, 292, 808; 83/411 R; 219/121 LG, 121 LJ, 121 LH, 121 LN; 51/284 R; 65/61, 65

[56] References Cited

U.S. PATENT DOCUMENTS

| | | | |
|---|---|---|---|
| 3,467,099 | 9/1969 | Lotmar | 128/303.1 |
| 3,586,813 | 6/1971 | Cruickshank et al. | 219/85 |
| 3,969,963 | 11/1973 | Goldman et al. | 128/303.1 |
| 3,981,705 | 9/1976 | Jaeger et al. | 65/2 |
| 4,135,902 | 1/1979 | Oehrle | 65/2 |
| 4,215,263 | 7/1980 | Grey et al. | 65/2 |
| 4,309,998 | 1/1982 | Aron nee Rosa et al. | 128/303.1 |
| 4,328,410 | 5/1982 | Slivinsky et al. | 219/121 LH |
| 4,350,163 | 9/1982 | Ford, Jr. et al. | 128/633 |
| 4,391,275 | 7/1983 | Fankhauser et al. | 128/303.1 |
| 4,427,872 | 1/1984 | Saunders | 219/121 LH |
| 4,429,210 | 1/1984 | Sudo et al. | 219/121 LW |
| 4,456,811 | 6/1984 | Hella et al. | 219/121 LM |
| 4,461,294 | 7/1984 | Baron | 128/303.1 |
| 4,467,168 | 8/1984 | Morgan et al. | 219/121 LG |
| 4,473,735 | 9/1984 | Steffen | 219/121 LF |
| 4,533,812 | 8/1985 | Lorenz | 219/121 LH |
| 4,534,723 | 8/1985 | Dillon et al. | 425/808 |
| 4,538,608 | 9/1985 | L'esperance, Jr. | 128/303.1 |
| 4,558,698 | 12/1985 | O'Dell | 128/303.1 |
| 4,563,565 | 1/1986 | Kampfer et al. | 219/121 LJ |
| 4,566,765 | 1/1986 | Miyauchi et al. | 350/619 |

OTHER PUBLICATIONS

"Planar Lamellar Refractive Keratoplasty," by Casimir A. Swinger, et al., published in the Journal of Refractive Surgery, vol. 2, No. 1, Jan./Feb. 1986, pp. 17-24.
"Kinetics of the Ablative Photodecomposition of Organic Polymers in the Far Ultra-violet," by R. Srinivasan, published in the J. Vac. Technol. B.1(4), 10-12, 1983.
"Medical Applications of Excimer Lasers," by Randall J. Lane et al., published in Lasers & Applications, vol. 3, No. 11, Nov. 1984, pp. 59-62.
"Keratomileusis for Myopia and Aphakia," by Jose I. Barraquer, published in Ophthalmology, vol. 88, No. 8, Aug. 1981, pp. 701-708.
"Epikeratophakia: The Surgical Correction of Aphakia. I. Lathing of Corneal Tissue," by Theodore P. Werblin et al., published in Current Eye Research, vol. 1, No. 3, 1981.
"Excimer Laser Surgery of the Cornea," by S. L. Trokel et al., published in the American Journal of Ophthalmology, vol. 96, No. 6, Dec. 1983 pp. 710-715.
"Advanced Techniques in Ophthalmic Microsurgery," by Louis J. Girard, published in Corneal Surgery, vol. 2, 1981, 99.159-169.
"Laser Beam Wire Stripping Machine," by L. G. Nivens, published in *Technical Digest*, No. 56, Oct. 1979, pp, 19-20.

*Primary Examiner*—Bernard Nozick
*Attorney, Agent, or Firm*—Kendrick, Netter & Bennett

[57] ABSTRACT

A system for photoablating a product blank such as a corneal lenticule includes a molding means having a predetermined size and shape to which the finished, molded product should conform. The system includes a source of photoablating light such as an excimer laser, a mechanism for aligning light from the excimer laser with the mold and a blank in the mold. The mold is made of material impervious to photoablating light so that the walls of the mold surrounding the cavity protect the product blank within the cavity when the laser beam is kept parallel to the top surface of the mold, essentially comprising a three-dimensional photoresist. With the moldable product blank held against the inner mold surface, and a portion of the product blank projecting from the mold, photoablating light directed onto the mold and onto the projecting portion removes only the projecting portion, leaving a finished product having a size, shape and conformation substantially identical to the inner mold cavity.

7 Claims, 4 Drawing Figures

SYSTEMS AND METHODS FOR PRECISE, ACCURATE FORMATION OF PRODUCTS BY PHOTOABLATION

This invention relates to systems and methods for forming, by photoablation and molding, products having precise, accurate, predetermined dimensions, and, in particular, to systems and methods for forming living corneal lenticules of predetermined size and shape, precisely and accurately, by photoablation and molding. These systems comprise mold means for holding a photoablatable moldable product blank. The mold means is preferably substantially impervious to light capable of photoablating such a blank. Preferably, the mold means includes an internal mold space having the predetermined, precise, accurate conformation of the desired product, and means for holding the product blank firmly against the inner mold surface during photoablation without compressing or otherwise distorting the product blank. The mold means preferably has a smooth planar surface at the opening of the mold space, perpendicular to the axis of revolution of the mold space. Photoablating light passing across this surface determines the superior surface of the product with the other surfaces being determined by the mold. The system essentially functions as a three-dimensional photoresist.

In preferred embodiments, the mold means is linked to controls that permit adjustment, in X, Y and Z planes, of the angle of incidence, on the blank, of light capable of photoablating the product blank. The molding means can also be linked to means for rotating the molding means in the path of photoablating light to achieve a more uniform, symmetrical product.

In use, the mold means is linked with means for generating light capable of photoablating the product blank. Preferably, this photoablating light comprises intense, coherent, collimated, ultraviolet light, such as light from an excimer laser, meaning light having a wavelength in the range of about 150 to about 250 nanometers. Preferably, the fluence (i.e., the power density) of the photoablating light is in the range of about 20 to about 1,000 milliJoules per square centimeter per pulse. Pulse durations for the excimer laser are in the range of about 5 to about 15 nanoseconds (ns).

These systems can also include means for aiming and aligning the source of photoablating light with the mold means. In preferred embodiments, another light source, coaxial with the source of photoablating light, and a means for detecting the angle of incidence of this light on the mold means, can be used to align light from the photoablating light source with the mold means. In preferred embodiments, this means for aiming and aligning the source of photoablating light is a coaxial aiming laser such as a helium neon laser or other laser capable of emitting non-photoablating light coaxial with light from the photoablating light source. Preferably, the axis of the mold around which the cavity was formed (by lathing or otherwise), and around which the mold can rotate, should be held vertical, and perpendicular to the photoablating light.

This invention also provides methods for forming precision products comprising placing a photoablatable, moldable product blank in mold means having an inner surface of a desired predetermined size and shape substantially conforming to the desired size and shape of the desired finished product; placing and holding a photoablatable moldable product blank against this inner mold surface; and directing light capable of photoablating the product blank onto the portions of the product blank projecting from the mold at an angle of incidence sufficient to photoablate the projecting material above the plane of the mold opening that is unprotected by the mold from the photoablating light. Preferably, the moldable, photoablatable product blank should fill the mold. If the mold is incompletely filled, then the product may not be identical to the mold space. If the mold is overfilled, excess material protruding from the mold is easily photoablated.

A particularly preferred embodiment of these systems comprises, as the molding means, a lenticule holder made of a material such as polymethylmethacrylate or glass that is impervious to photoablating light from a source such as an excimer laser. The inner surface of the holder has one or more predetermined radii of curvature, and a predetermined size and shape, formed by a process such as lathing. The conformation of the mold's inner surface determines the refractive power of the finished product lenticule. The corneal lenticules can be spherical, aspheric or toric, and can be plus powered or minus powered.

The lenticule blank is placed in the mold, and held there by vacuum or capillary action, without compressing or excessively deforming the lenticule. During molding of the lenticule, the lenticule and mold are maintained in substantially vertical posture. Photoablating light from an excimer laser is fired horizontally across the opening of the mold, and strikes and removes the portions of the lenticule extending beyond the mold opening. During photoablation, the mold can be rotated to insure even, complete photoablation. The polymethylmethacrylate material of the mold blocks photoablating light, preventing ablation of lenticule tissue lying inside the cavity of the mold. Because substantially no heat or shock waves occur in photoablation, the keratocytes (corneal stromal cells) and collagen in the lenticule portions inside the mold are substantially undamaged.

The result is a precise, living corneal lens which quickly becomes transparent, and can be sewn onto the anterior surface of a human cornea, or implanted within the stroma of a human cornea, as in epikeratophakia, keratomileusis or keratophakia, for correction of refractive errors. Because substantially no temperature change or deforming stress is exerted on the lenticule blank during photoablation, refractive defects resulting from such causes in the finished lenticule are minimal. Visual rehabilitation is more rapid, and the predictability of the refractive outcome is improved.

BRIEF DESCRIPTION OF THE DRAWINGS

This invention can better be understood by reference to the accompanying drawings, FIGS. 1A, 1B, 1C and 1D, showing a schematic cross-sectional diagram of a preferred embodiment of the new photoablating system, here used to photoablate a corneal button and form a lenticule.

DESCRIPTION OF THE PREFERRED EMBODIMENT

Figure 1A:
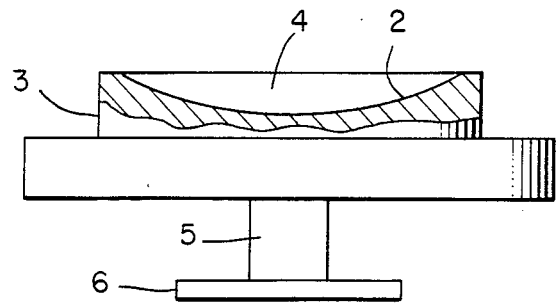
FIG. 1a shows a preferred embodiment of a mold and mold cavity for use in the new photoablating system.
Figure 1B:
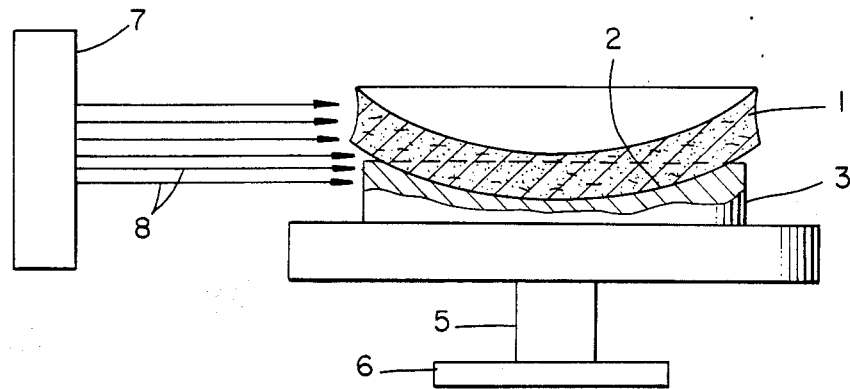
FIG. 1b shows the use of an excimer laser with the mold and mold cavity of FIG. 1a to direct photoablating light across the plane of the opening in the mold cavity and across a corneal lens blank.
Figure 1C:
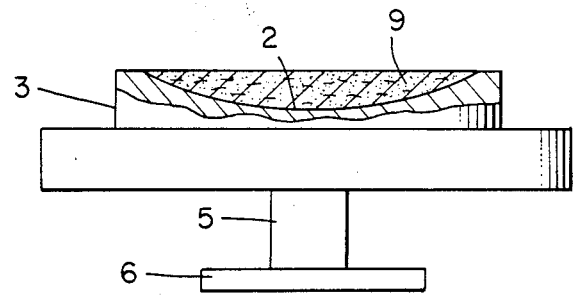
FIG. 1c shows the mold and mold cavity illustrated in FIGS. 1a and 1b after light from the excimer laser shown in FIG. 1b has removed the portions of the lens blank that extend outside the mold cavity.
Figure 1D:
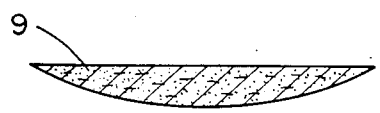
FIG. 1d shows the product corneal lens made in the embodiment shown in FIGS. 1a, ab, and 1c, and having the confirmation of the mold surface.

The drawings show the preferred embodiment of the new photoablating system. In these drawings, FIG. 1a shows a preferred embodiment of a mold and mold cavity for use in the new photoablating system. FIG. 1b shows the use of an excimer laser to direct photoablating light across the plane of the opening in the mold cavity and across a corneal lens blank. FIG. 1c shows the mold and mold cavity illustrated in FIGS. 1a and 1b after light from the excimer laser has removed the portions of the corneal lens that extend outside the mold cavity. FIG. 1d shows the resulting product.

In the drawings, FIGS. 1a, 1b, 1c, 1d, lenticule blank 1 is held firmly, but atraumatically and non-deformationally, against surface 2 in cavity 4 of mold 3. Surface 2 has a predetermined desired size and shape, and one or more predetermined radii of curvature. Excimer laser 7 is adjusted to direct photoablating light beam 8 across the plane of the opening in cavity 4, and photoablates those portions of blank 1 projecting beyond this plane. During the photoablating, mold 3 rotates on spindle 5. Spindle 5, in turn, is rotatably mounted on base member 6. No photoablating light strikes the portions of blank 1 inside cavity 4 because mold 3 is impervious to such light. The resulting product is a precise, living corneal lens 9 which quickly becomes transparent and which has the conformation of mold surface 2 in size, shape and radii of curvature.

What is claimed is:

1. A system for shaping a moldable photoablatable product blank into a finished product comprising mold means for holding a moldable photoablatable product blank, said mold means having an interior surface of predetermined size and shape, said mold means being substantially impervious to photoablating light; means for generating light capable of photoablating said product blank; and means for directing light capable of photoablating said product blank across and against the opening of said mold means to photoablate the portions of the product blank projecting from said opening without affecting the product blank inside the mold.

2. The system of claim 1 wherein said product blank is a corneal lenticule, and said mold has a cavity of predetermined radii of curvature, diameter and depth.

3. The system of claim 2 wherein said means for generating light capable of photoablating said product blank comprises an excimer laser.

4. The system of claim 1 wherein said means for generating light capable of photoablating said product blank is a source of coherent, intense, collimated light having a wavelength in the range of about 150 to about 250 nanometers, a power density in the range of about 20 to about 1,000 milliJoules per square centimeter per pulse and a pulse duration in the range of about 5 to about 15 nanoseconds.

5. A system for shaping a corneal lenticule into a product lenticule having a predetermined desired refractive power comprising mold means for holding said corneal lenticule, said mold means having a cavity of size and shape adapted to produce a lenticule product of a predetermined, desired refractive power, said mold means being substantially impervious to photoablating light; means for generating light capable of photoablating said corneal lenticule; and means for directing light capable of photoablating said corneal lenticule across and against the opening of said mold means to photoablate those portions of the corneal lenticule projecting from the opening of said mold means without affecting those portions of the corneal lenticule inside the mold.

6. The system of claim 5 wherein said means for generating light capable of photoablating said product blank comprises an excimer laser.

7. The system of claim 5 wherein said means for generating light capable of photoablating said product blank is a source of coherent, intense, collimated light having a wavelength in the range of about 150 to about 250 nanometers, a power density in the range of about 20 to about 1,000 milliJoules per square centimeter per pulse and a pulse duration in the range of about 5 to about 15 nanoseconds.

* * * * *